United States Patent [19]

Morio et al.

[11] 4,163,253

[45] Jul. 31, 1979

[54] METHOD OF AND APPARATUS FOR MODIFYING A VIDEO SIGNAL TO PREVENT UNAUTHORIZED RECORDING AND REPRODUCTION THEREOF

[75] Inventors: Minoru Morio; Masahiro Kambara, both of Tokyo, Japan

[73] Assignee: Sony Corporation, Tokyo, Japan

[21] Appl. No.: 780,242

[22] Filed: Mar. 22, 1977

[30] Foreign Application Priority Data

Mar. 23, 1976 [JP] Japan .................................. 51-31592

[51] Int. Cl.² .............................................. H04N 7/16
[52] U.S. Cl. ...................................... 358/120; 360/33; 360/37
[58] Field of Search ...................... 360/33, 37; 358/120

[56] References Cited

U.S. PATENT DOCUMENTS

| | | | |
|---|---|---|---|
| 2,909,597 | 10/1959 | Johnson | 360/33 |
| 3,081,376 | 3/1963 | Loughlin et al. | 358/120 |
| 3,439,113 | 4/1969 | Walker | 358/120 |
| 3,446,914 | 5/1969 | Hodge | 360/37 |
| 3,532,808 | 10/1970 | Fujisawa | 360/33 |
| 3,824,332 | 7/1974 | Horowitz | 358/124 |
| 3,963,865 | 6/1976 | Songer | 358/120 |

*Primary Examiner*—S. C. Buczinski
*Attorney, Agent, or Firm*—Lewis H. Eslinger; Alvin Sinderbrand

[57] ABSTRACT

A method of and apparatus for modifying a video signal such that a video picture can be reproduced by a video display device in response to the modified video signal, but if the modified video signal is transmitted and then recorded on a video signal recorder, a satisfactory video picture cannot be reproduced if that recorded modified video signal subsequently is played back. A pulse whose amplitude is substantially equal to the peak white level of the video signal is inserted into respective horizontal blanking intervals of the video signal. If this modified video signal is recorded on a conventional type of video signal recorder, the presence of the inserted pulse signal is detected by an automatic gain control (AGC) detector which, in turn, controls an AGC amplifier to substantially attenuate the modified video signal which then is recorded.

20 Claims, 10 Drawing Figures

METHOD OF AND APPARATUS FOR MODIFYING A VIDEO SIGNAL TO PREVENT UNAUTHORIZED RECORDING AND REPRODUCTION THEREOF

BACKGROUND OF THE INVENTION

This invention relates to a method of and apparatus for modifying a video signal and, more particular, to such a method and apparatus wherein a predetermined signal is inserted into the horizontal blanking interval of the video signal such that a video picture can be reproduced directly from the modified video signal but a satisfactory video picture cannot be reproduced if the modified video signal is recorded and then played back on a conventional type of video signal recorder.

In many instances, it is desirable to modify a video signal so as to prevent or discourage unauthorized use thereof. For example, with the recent introduction of video signal recording systems, such as video tape recorders (VTR), it may be desirable to modify the video signals in a manner which would prevent the reproduction of a satisfactory video picture in the event that such video signals are recorded and then played back, but the modification should be of the type which would permit a satisfactory video picture to be reproduced directly if the modified video signals are broadcasted. As another example, it would be advantageous if master video recording media, such as video tapes, could be recorded in a manner such that a satisfactory video picture can be reproduced directly from such media but not from a copied version thereof. Hence, the recorded information, such as a television program, which may be expensive to produce, could not be copied without authorization, thereby minimizing the risk of "piracy."

Video signal modification for the purpose of avoiding piracy can be attained by using unique encoding and decoding techniques, but such techniques are quite expensive, and suitable decoding apparatus must be provided with each television receiver in order to display a satisfactory video picture from the received, encoded video signal.

One proposal for modifying a video signal so as to avoid the piracy thereof is described in British Pat. No. 1,028,025, published May 4, 1966. In that system, the black levels in a video signal are detected and used to generate "decoy" signals having the nature of horizontal synchronizing signals, which decoy signals are coincident with the detected black levels. Unless these decoy signals are removed from the video signal, they are erroneously interpreted by a conventional television receiver as being horizontal synchronizing signals. Hence, the horizontal oscillator included in the television receiver cannot be synchronized properly with the correct horizontal synchronizing signals included in the modified video signal. Since this proposal depends entirely on the presence of black levels in many horizontal line intervals, there is the possibility that, in the absence of such black levels in a particular televised scene, this video signal modifying technique may not be successful.

Another proposal for modifying a video signal to avoid piracy is described in copending application Ser. No. 778,709 filed Mar. 17, 1977, which has been filed by the inventors of the present invention and which has a common assignee. In that other proposal, the vertical synchronizing pulses included in the vertical blanking interval are modified in a fashion such that the usual vertical oscillator included in a television receiver nevertheless can be synchronized with the modified vertical synchronizing pulses, but the modified vertical synchronizing pulses cannot be detected in a conventional video signal recorder, such as a VTR. Since the detection of such vertical synchronizing pulses is necessary for the proper operation of the VTR, the inability to detect such pulses results in the recording and reproduction of a video picture having poor quality.

The present invention is directed to an alternative technique for modifying a video signal so as to avoid piracy.

OBJECTS OF THE INVENTION

Therefore, it is an object of the present invention to provide a method of and apparatus for modifying a video signal so as to avoid the unauthorized use thereof.

Another object of this invention is to provide a simplified method for modifying a video signal, and relatively inexpensive apparatus for carrying out that method, whereby the modified video signal will enable a television receiver to display a video picture upon reception thereof, but will prevent a satisfactory reproduction of a video picture if that modified video signal is recorded and subsequently reproduced without authorization.

A further object of this invention is to provide a method of and apparatus for modifying the horizontal blanking interval of a video signal so as to prevent the unauthorized recording and reproduction of such modified video signal.

An additional object of this invention is to provide a method of and apparatus for producing a master video recording medium which can be used directly for the reproduction of a satisfactory video picture, but which, if copied, will result in an unsatisfactory video picture upon reproduction of the copied medium.

Still another object of this invention is to provide a modified video signal which has a particular effect upon the automatic gain control circuit in a conventional video signal recorder such that the modified video signal is recorded with substantial attenuation.

Various other objects, advantages and features of the present invention will become readily apparent from the ensuing detailed description, and the novel features will be particularly pointed out in the appended claims.

SUMMARY OF THE INVENTION

In accordance with the present invention, a method of and apparatus for processing a video signal are provided wherein a pulse signal whose amplitude is substantially equal to the peak white level of the video signal is inserted into respective horizontal blanking intervals of that video signal. In one embodiment, the modified video signal is recorded on a master recording medium. In another embodiment, a modified video signal is transmitted for reception by television receivers.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
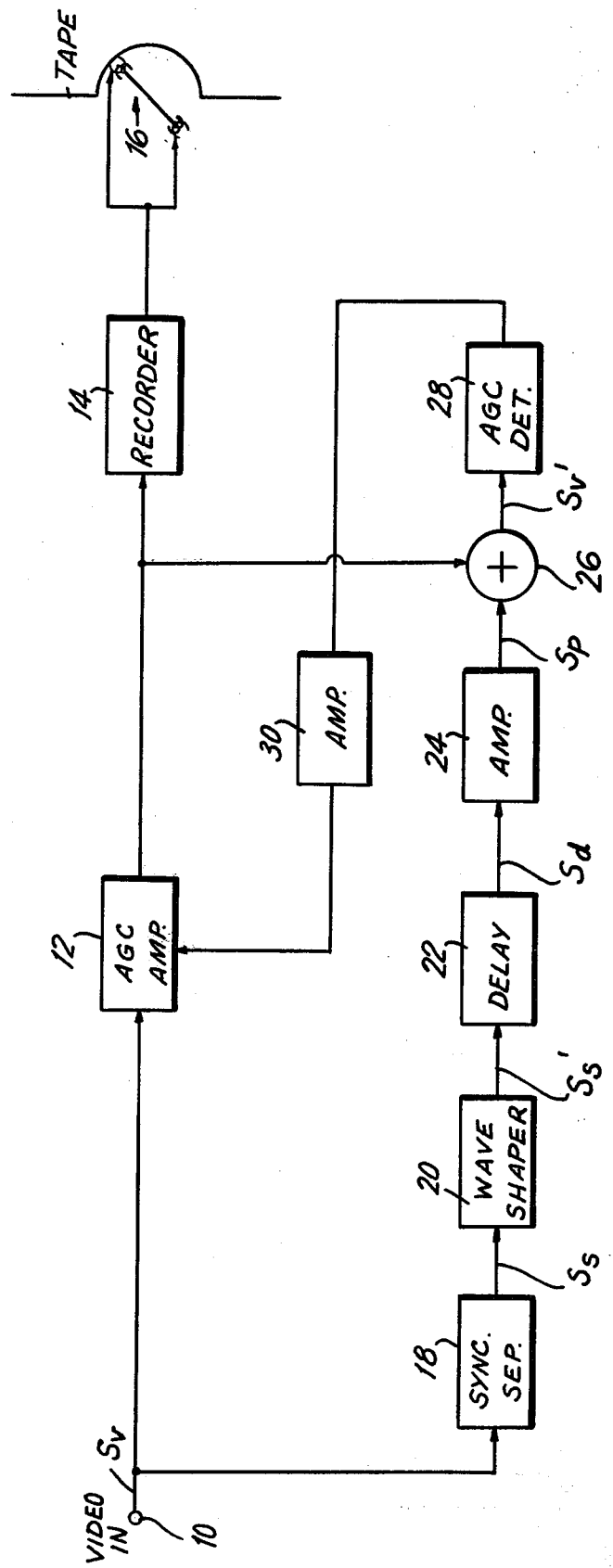
FIG. 1 is a block diagram of typical AGC circuitry used in conventional video signal recorders.

The manner in which the present invention effects modification of a video signal to prevent the unauthorized use thereof, and thus avoid piracy, can best be appreciated by first understanding how a conventional video signal recorder, such as a VTR, operates. One example of such a VTR is illustrated in FIG. 1. In particular, this VTR is of the type wherein tape is wrapped about a guide drum and rotary transducers 16 scan successive parallel tracks across the tape. During a recording operation, video signals, which have been processed by recording circuitry, are recorded in these tracks. The VTR also includes automatic gain control (AGC) circuitry for providing the recording transducers with a video signal of suitable amplitude. Thus, if a transmitted video signal has been attenuated during its transmission, the AGC circuitry will restore that attenuated video signal to its proper level. Conversely, if the level of the video signal which is received by the VTR is too great, the AGC circuitry will correspondingly reduce, or attenuate that signal.

As shown in FIG. 1, the AGC circuitry includes an AGC amplifier 12 which is coupled to a video input terminal 10 for receiving a composite video signal $S_v$, such as an NTSC color video signal, a black-and-white video signal, or other type of video signal, such as a PAL or SECAM signal, or the like. The gain of AGC amplifier 12 is regulated by control circuitry to be described so as to selectively amplify or attenuate the received video signal, depending upon the actual level of the received signal. For this purpose, AGC amplifier 12 includes an AGC control input coupled to gain determining circuitry. The output of AGC amplifier 12 is coupled to conventional recorder circuitry 14 which, in turn, processes a video signal, as amplified by the AGC amplifier, for recording by transducers 16.

The gain determining circuitry used in conjunction with AGC amplifier 12 includes a synchronizing signal separator circuit 18, a wave shaper circuit 20, a delay circuit 22, an amplifier 24, an adding or combining circuit 26, an AGC detecting circuit 28 and an amplifier circuit 30. Synchronizing signal separator circuit 18 is coupled to input terminal 10 and is adapted to separate the synchronizing signals included in the composite video signal supplied to terminal 10. Thus, the synchronizing signal separator circuit effectively strips the signals included in the vertical blanking interval and the signals included in the horizontal blanking interval from the composite video signal. For the purpose of the present discussion, only the horizontal blanking interval is of interest. Thus, if the received video signal is a black-and-white signal, synchronizing signal separator circuit 18 detects the horizontal synchronizing pulses included in the successive blanking intervals which separate successive lines of video information; and if the video signal is a color signal, the synchronizing signal separator circuit detects both the horizontal synchronizing pulses and the burst signals normally provided in the horizontal blanking intervals.

The output of synchronizing signal separator circuit 18 is coupled to a pulse generator shown as wave shaper circuit 20. The wave shaper circuit is adapted to produce a pulse that is substantially coincident with the horizontal synchronizing pulse which is detected by synchronizing signal separator circuit 18. In one embodiment, wave shaper circuit 20 comprises a monostable multivibrator for generating a pulse of predetermined amplitude and predetermined duration in response to the detected horizontal synchronizing pulse. In another embodiment, wave shaper circuit 20 is comprised of an inverting amplifier so as to invert the polarity of the horizontal synchronizing pulse and to amplify the inverted pulse. The output of wave shaper circuit 20 is coupled to a delay circuit 22. This delay circuit may be of conventional construction and is adapted to impart a predetermined time delay to the pulse supplied thereto by the wave shaper circuit. The output of delay circuit 22 is supplied through amplifier 24 to combining circuit 26. Amplifier 24 is capable of amplifying the level of the delayed pulse supplied from delay circuit 22. In a preferred embodiment, the amplitude of the delayed, amplified pulse supplied by amplifier 24 is substantially equal to the peak white level of the video signal. For example, if the total level from the tip of the horizontal synchronizing pulse to the maximum video signal level is considered to be 100%, then the horizontal synchronizing pulse amplitude is equal to 30% and the maximum video signal, which is equal to the peak white level, is equal to 70%. Stated otherwise, if the horizontal synchronizing pulse is assumed to have a magnitude equal to 0.3 volts, then the peak white level will be equal to 0.7 volts. Accordingly, amplifier 24 may comprise any suitable limiting amplifier, saturation amplifier, or the like. In an alternative embodiment, wave shaper circuit 20 may include an amplifier comparable to amplifier 24 such that amplifier 24 may be omitted from the circuit shown in FIG. 1.

Combining circuit 26 is adapted to algebraically combine the delayed, amplified pulse supplied thereto from amplifier 24, or its equivalent, and the video signal which is amplified by AGC amplifier 12. Accordingly, combining circuit 26 includes one input coupled to the output of amplifier 24 and another input coupled to the output of AGC amplifier 12. This combining circuit may comprise an algebraic adder or summing circuit, a mixing circuit, or other conventional combining circuit. The output of combining circuit 26 is coupled to AGC detector 28 which is adapted to produce a control signal proportional to the level difference between the tip of the horizontal synchronizing pulse and the peak of the pulse supplied from amplifier 24. This signal is, in turn, amplified by amplifier 30 and supplied as a AGC control signal to AGC amplifier 12. Thus, if the detected level differential between the peak white level, as represented by the peak of the pulse signal produced by amplifier 24, and the tip of the horizontal synchronizing pulse is less than some predetermined amount, the gain of AGC amplifier 12 is increased. Conversely, if this level differential exceeds the predetermined amount, the gain of amplifier 12 is decreased.

Figure 2A:
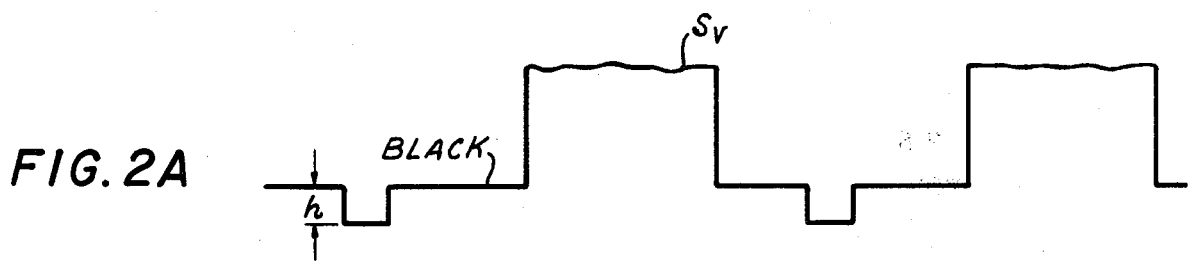
FIGS. 2A–2G are waveform diagrams which are helpful in understanding the operation of the present invention.
Figure 2B:
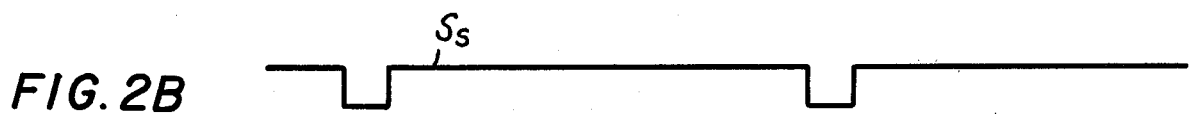
Figure 2C:

The operation of the AGC circuit shown in FIG. 1 now will be described in conjunction with the waveform diagram shown in FIGS. 2A-2F. Let it be assumed that the video signal $S_v$ which is applied to input terminal 10 has the waveform shown in FIG. 2A. As illustrated, successive horizontal line intervals containing the video signal information are separated by periodic horizontal blanking intervals. The horizontal blanking interval includes a horizontal synchronizing pulse of amplitude h. If the black level is assumed to be a reference level, then the horizontal synchronizing pulse is shown as a negative-going pulse and the video signal is shown as a positive signal with respect to this black reference level. As is conventional, the maximum amplitude which can be achieved by the video information is known as the peak white level. Synchronizing signal separator circuit 18 separates the horizontal synchronizing pulses from the composite video signal so as to produce the periodic horizontal synchronizing pulses $S_s$ shown in FIG. 2B. Wave shaper circuit 20 responds to the separated horizontal synchronizing pulses to produce positive-going pulses $S_s'$, as shown in FIG. 2C. Preferably, the duration of these positive-going pulses $S_s'$ is equal to the duration of the horizontal synchronizing pulses. However, these positive-going pulses may be of a different duration. As mentioned previously, wave shaper circuit 20 may include a monostable multivibrator, or other one-shot circuit, which is responsive to the separated horizontal synchronizing pulses $S_s$ to produce the positive-going pulses $S_s'$.

Figure 2D:
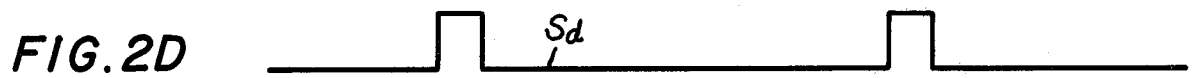

Delay circuit 22 imparts a predetermined delay to pulses $S_s'$ so as to produce a delayed version of these pulses, as represented by delayed pulses $S_d$, shown in FIG. 2D. These delayed pulses $S_d$ are, in turn, amplified by amplifier 24 so as to have the peak white level p, as shown by pulses $S_p$ in FIG. 2E. As mentioned previously, amplifier 24 can be omitted if wave shaper circuit 20 includes a comparable amplifying circuit such that the delayed pulses which are derived from delay circuit 22 have an amplitude substantially equal to the peak white level p, as represented by pulses $S_p$.

The delayed, amplified pulses $S_p$ are combined in combining circuit 20 with an amplified version of video signal $S_v$. In the illustrated embodiment, pulses $S_p$ are delayed so as to coincide with the back porch of the horizontal synchronizing pulses. Thus, when these delayed pulses $S_p$ are combined with the video signal $S_v$, the resultant signal appears as modified video signal $S_v'$ shown in FIG. 2F. For the purpose of illustration, it has been assumed that, in the illustrated horizontal line intervals, the video information signal has not reached the peak white level. Thus, the delayed, amplified pulses $S_p$ have an amplitude which is greater than the video signal information level. Of course, it should be readily appreciated that if the video signal includes white information, the video information signal may have a peak white level substantially equal to the amplitude of pulses $S_p$.

AGC detector 28 detects the difference between the tip of the horizontal synchronizing pulse and the peak of pulses $S_p$. That is, AGC detector 28 detects the total distance h+p, shown in FIG. 2F. Depending upon the magnitude of h+p, a corresponding gain control signal is produced and applied to AGC amplifier 12 via amplifier 30. Thus, if h+p is less than a predetermined amount, for example, 1.0 volts, the gain of AGC amplifier 12 is increased. This, in turn, increases the horizontal synchronizing pulse amplitude h such that h+p now equals 1.0 volts. Conversely, if h+p is greater than 1.0 volts, the gain of AGC amplifier 12 is reduced so as to correspondingly reduce the amplitude h of the horizontal synchronizing pulse. Although the gain control signal produced by AGC detector 28 varies the gain of AGC amplifier 12, it is appreciated that the amplitude p of pulses $S_p$ remains substantially constant notwithstanding this change in the gain of amplifier 12.

After suitable amplification in amplifier 12, video signal $S_v$ (FIG. 2A) is recorded by recording apparatus 14 on tape via transducers 16.

In the AGC circuitry of FIG. 1, AGC detection and gain control is substantially independent of the actual video information level. This avoids the problem of differentiating between an attenuated video signal and a correct video signal representing almost black information. That is, if the video signal information per se is detected for an AGC determination, it is possible that the gain of the AGC amplifier will be increased erroneously in the event that the video signal information represents a very dark scene.

Figure 2E:
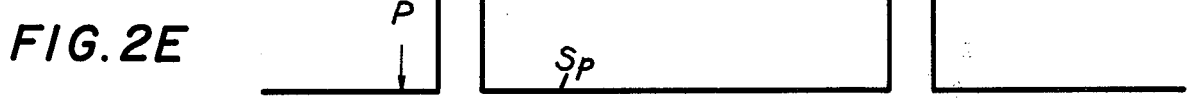

The technique in accordance with the present invention relies upon the AGC circuitry shown in FIG. 1. That is, since the gain of AGC amplifier 12 is dependent upon the difference between the level of the horizontal synchronizing pulse and the level of the reference pulse $S_p$ added to the video signal, it follows that the gain of the AGC amplifier will be substantially reduced if the resultant reference signal $S_p$ which is added to the video signal is excessively high. The present invention proceeds by modifying the video signal $S_v$ so as to exhibit the form shown in FIG. 2F. Thus, if a reference pulse $S_p$ is added to the modified video signal $S_v'$ (FIG. 2F), the resultant reference signal will have an amplitude equal to the sum of the coinciding reference pulse which is added and the reference pulse which already is included in the modified video signal. This resultant signal thus will include an inserted pulse having an amplitude 2p, as shown by the signal $S_v''$ in FIG. 2G. The total amplitude h+2p, if detected by AGC detector 28, will result in a control signal that substantially reduces the gain of AGC amplifier 12, thereby attenuating the modified video signal which is recorded.

Figure 2F:
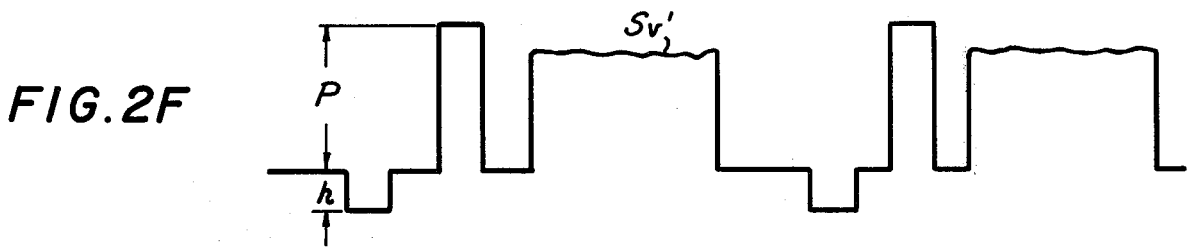
Figure 2G:
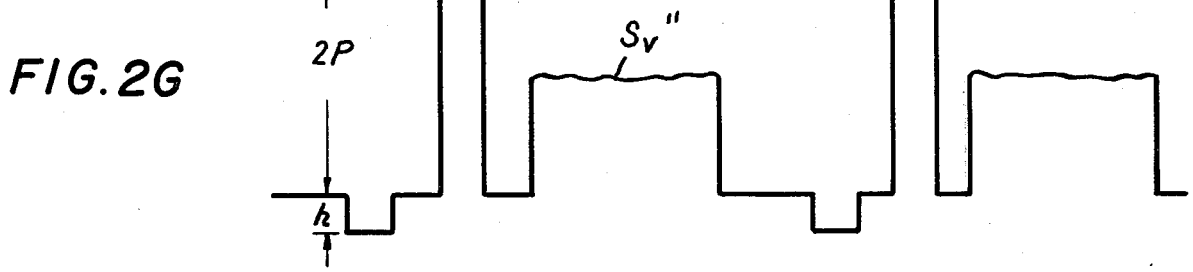
Figure 3:
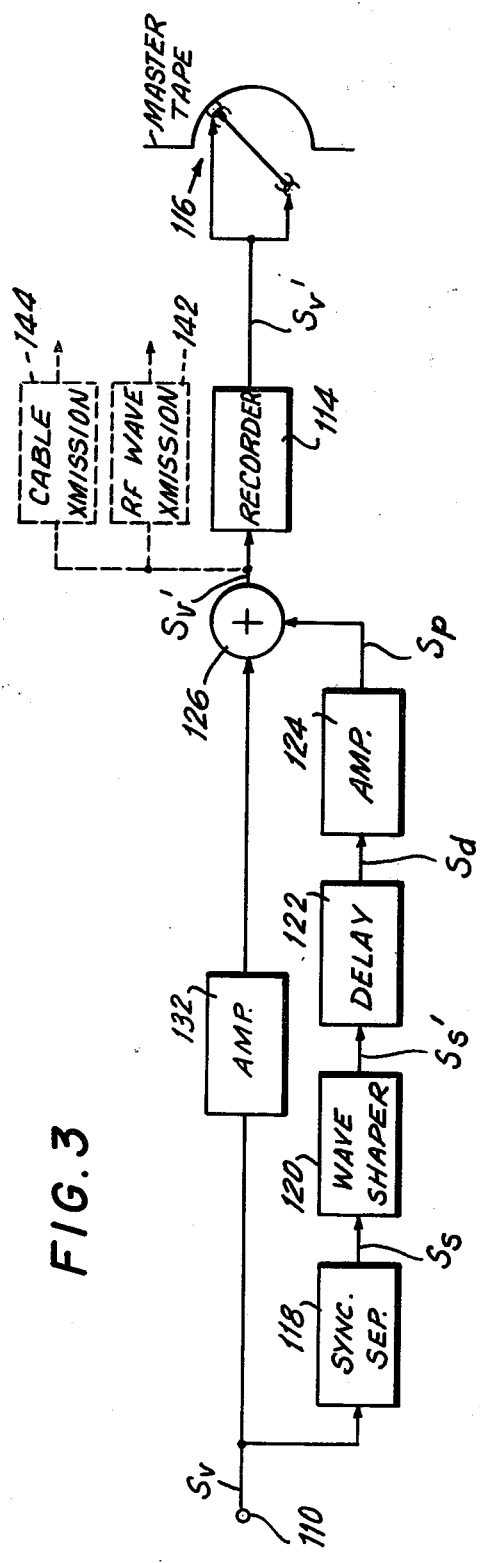
FIG. 3 is a block diagram showing one embodiment of apparatus for modifying a video signal in accordance with the present invention.

The apparatus which is used to modify the video signal $S_v$ so as to appear as shown by the modified video signal $S_v'$ in FIG. 2F is illustrated in FIG. 3. Many of the elements shown in FIG. 3 are similar to corresponding elements described previously with respect to FIG. 1 and, therefore, are identified by similar reference numerals having the prefix "1" Thus, as shown in FIG. 3, an input terminal 110 is coupled to a synchronizing signal separator 118 which, in turn, is coupled to a wave shaper circuit 20, the output of which being supplied to a delay circuit 122 for application to an amplifier 124 and then to a combining circuit 126. These elements in FIG. 3 are similar to the corresponding elements in FIG. 1.

Input terminal 110 additionally is coupled to another input of combining circuit 126 via an amplifier 132. In the embodiment shown in FIG. 3, amplifier 132 is not an AGC amplifier. However, if desired, amplifier 132 can include gain adjusting circuitry.

In operation, synchronizing signal separator circuit 118, wave shaper circuit 120, delay circuit 122, amplifier 124 and combining circuit 126 operate in the manner described hereinabove with respect to the corresponding elements of FIG. 1. Thus, these respective elements produce signals having the waveforms shown in FIGS. 2B, 2C, 2D and 2E, respectively. The input video signal $S_v$, after suitable amplification in amplifier 132, is supplied to combining circuit 125 whereat it is combined with reference pulses $S_p$ (FIG. 2E) so as to form the modified video signal $S_v'$ (FIG. 2F). Thus, the reference pulse is inserted onto the back porch of the horizontal synchronizing pulse included in the horizontal blanking interval. In one embodiment, this reference pulse is inserted into each horizontal blanking interval. In another embodiment, this reference pulse is inserted into selected ones, or random horizontal blanking intervals.

The modified video signal $S_v'$ of FIG. 2F can be recorded on a master tape via recording circuitry 114 and suitable transducers 116. Preferably, if recorder circuitry 114 includes AGC circuitry, it is insensitive to the inserted reference pulse shown in FIG. 2F. Thus, if recorder circuitry 114 includes an AGC circuit of the type shown in FIG. 1, it may include a black-level clipping circuit for removing the inserted reference pulse prior to combining the modified video signal $S_v'$ with reference pulse $S_p$ in combining circuit 26. That is, the AGC circuit included in recorder circuitry 114 may be of the type wherein only the horizontal synchronizing pulses and reference pulses $S_p$ are combined for detection in AGC detector 28 (FIG. 1). As another embodiment thereof, recorder circuitry 114 may be of the conventional type which detects the actual video signal information level for AGC purposes.

In FIG. 3, the modified video signal $S_v'$ produced by combining circuit 126 may be supplied to other output circuitry, if desired. Thus, the modified video signal shown in FIG. 2F can be transmitted directly via RF wave transmission system 142 or via cable transmission system 144. The presence of the inserted reference pulse $S_p$ in the horizontal blanking intervals of modified video signal $S_v'$ will have no effect upon the signal receiving circuitry or beam scanning control circuitry included in a conventional television receiver. Thus, notwithstanding the modification of the video signal, a television receiver can respond accurately to the modified video signal so as to reproduce a satisfactory video picture in response thereto.

Figure 4:
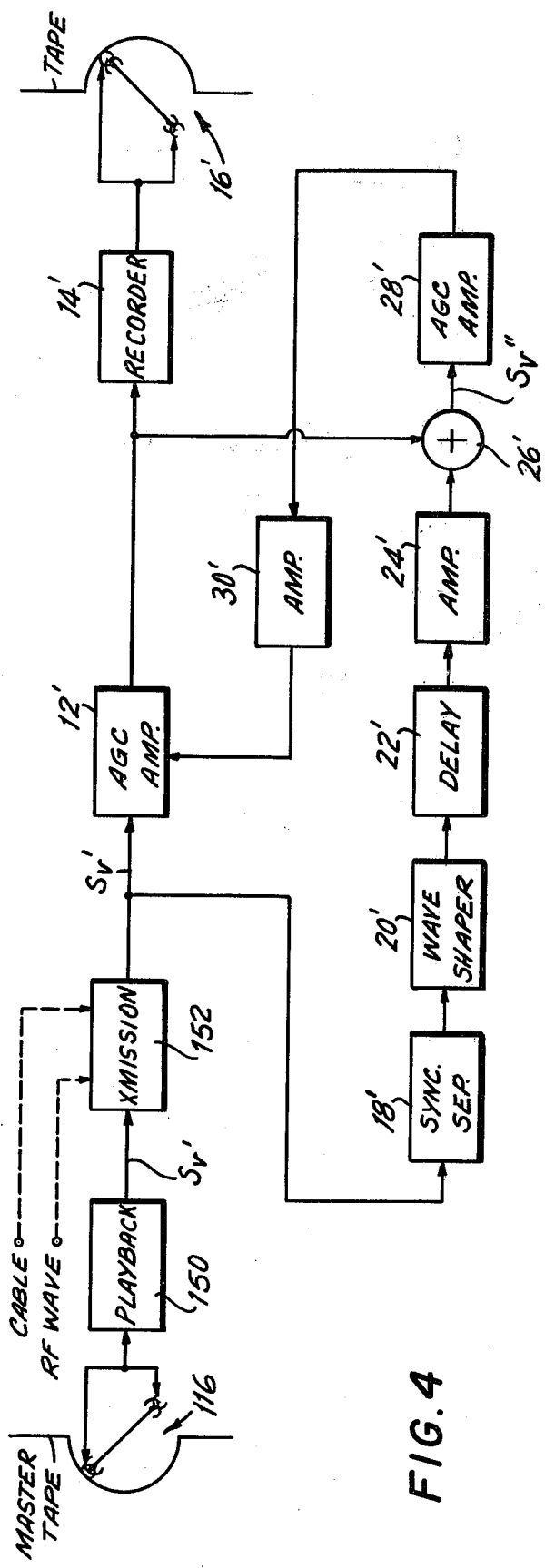
FIG. 4 is a block diagram of conventional video signal recording apparatus which might be used for the unauthorized recording of the modified video signal and from which an unsatisfactory video picture will be reproduced.

Let it now be assumed that the modified video signal $S_v'$, either as recorded on the master tape shown in FIG. 3, or as transmitted via RF wave transmission system 142 or cable transmission system 144, is recorded. For the purpose of the present discussion, it is assumed that this recording is unauthorized and, thus, is undesired. It is further assumed that the recording apparatus includes AGC circuitry of the type discussed previously with respect to FIG. 1. This unauthorized recording (or re-recording) is depicted by the apparatus shown in FIG. 4. It is understood that what is meant by "re-recording" is the duplication of the video signals which had been recorded on the master tape. If the master tape had been prepared, for example, for a tape library, this duplication thereof corresponds to the piracy mentioned hereinabove.

It is assumed that the modified video signals $S_v'$ are played back from the master tape by transducers 116, which may be the same as the recording transducers shown in FIG. 3. Hence, transducers 116 may be conventional record/playback heads. If desired, the master tape may be played back by apparatus other than the identical recording apparatus. Conventional playback circuitry 150 is provided to recover and reform the played back video signals in the usual manner. Thus, the modified video signal $S_v'$ which is played back from the master tape can be transmitted either directly to a monitor for reproducing a satisfactory video picture or can be transmitted in the form of a video broadcast, if desired, which also would result in a satisfactorily reproduced video picture.

A transmission system 152 is provided to transmit this played back modified video signal or, as depicted by the broken lines, to transmit the modified video signal $S_v'$ via RF wave transmission or cable transmission, as mentioned with respect to transmission systems 142 and 144, respectively, in FIG. 2. Although this transmitted modified video signal $S_v'$ can be used by a television receiver to reproduce a corresponding video picture, it is assumed for the purpose of the present discussion that this modified video signal is recorded by a conventional VTR having the AGC circuitry shown in FIG. 4. This AGC circuitry is identical to that described previously with respect to FIG. 1, and corresponding elements are identified by the same reference numerals, with the addition of a prime. Thus, the modified video signal $S_v'$ (FIG. 2F) is received and suitably amplified by AGC amplifier 12'. The gain of this amplifier is determined by the control signal supplied thereto via amplifier 30', as produced by AGC detector 28'.

Synchronizing signal separator circuit 18' separates the horizontal synchronizing pulses $S_s$ (FIG. 2B) from the received modified video signal $S_v'$, and these separated horizontal synchronizing pulses are used to generate pulses $S_s'$ in wave shaper circuit 20', these pulses appearing as shown in FIG. 2C. After a suitable delay in delay circuit 22', the delayed pulses $S_d$ are further amplified by amplifier 24' to form the reference pulses $S_p$, shown in FIG. 2E. These reference pulses now are added to the modified video signal $S_v'$ in combining circuit 26'. It is appreciated that, since the modified video signal already includes an inserted reference pulse, the further addition of another reference pulse results in an inserted reference pulse having an amplitude 2p equal to twice the white peak level. The modified video signal containing the additionally inserted reference pulse is shown as signal $S_v''$ in FIG. 2G.

AGC detector 28' functions to produce a gain determining signal proportional to the level difference between the tip of the horizontal synchronizing pulse and the peak of the inserted reference pulse. Thus, AGC detector 28' senses the total level h+2p included in the video signal $S_v''$ so as to produce a control signal which tends to substantially reduce the gain of AGC amplifier 12'. That is, AGC detector 28' misinterprets the very large reference pulse as being a very large horizontal synchronizing pulse. Based upon this misinterpretation, AGC detector 28' produces a gain control signal which has the effect of attenuating the modified video signal $S_v'$ (FIG. 2F) applied to AGC amplifier 12'. This attenuation is performed ostensibly for the purpose of returning the interpreted horizontal synchronizing pulse level to its proper amplitude. However, the actual effect of such attenuation is to sharply reduce the video information signal level, and this attenuated video signal is recorded by recorder circuitry 14' on the copy tape. Since this video signal is recorded with substantial attenuation, subsequent playback thereof from the tape results in an unsatisfactory video picture. Furthermore, the significant attenuation of the video signal prior to recording by recorder circuitry 14' degrades the signal-to-noise (S/N) ratio. This has the effect of introducing undesired noise in the video picture which ultimately is displayed in response to the played back tape.

While the present invention has been particularly shown and described with reference to a preferred embodiment thereof, it should be readily apparent that various changes and modifications in form and details can be made by one of ordinary skill in the art. For example, the particular location in the horizontal blanking interval into which the reference pulse $S_p$ of FIG. 2E is inserted is dependent upon the time delay imparted by delay circuit 122. In another embodiment, the delay is equal to almost one complete horizontal line interval. This has the effect of inserting the reference pulse onto the front porch of the horizontal synchronizing pulse. In yet another embodiment, delay circuit 122 may impart only a minimal delay, or may be omitted entirely, such that the reference pulse is inserted into the horizontal blanking interval so as to coincide either with some or all of the horizontal synchronizing pulse. In that event, amplifier 124, or its equivalent, may produce a reference pulse $S_p$ having an amplitude equal to p+h, such that the inserted reference pulse reaches the peak white level. In a still further embodiment, the video signal which is to be modified is a color video signal including a burst signal provided on the back porch of the horizontal synchronizing pulse. Hence, delay circuit 122 may impart a predetermined delay such that the reference pulse $S_p$ is inserted either between the horizontal synchronizing pulse and the burst signal or at a location immediately following the burst signal. In all of these alternative embodiments, the particular location of the inserted reference pulse should coincide, or at least overlap to some degree, with the reference pulse which is added by the AGC circuitry during unauthorized recording of the modified video signal. That is, the reference pulse which is inserted so as to modify the video signal should at least overlap with the reference pulse which is produced by delay circuit 22' and amplifier 24' in FIG. 4. Still further, although it is preferred that the inserted reference pulse have an amplitude equal to the peak white level, it is appreciated that the amplitude of the inserted reference pulse need be of a level such that when added to the reference pulse produced in the recorder AGC circuitry, such as produced by delay circuit 22' and amplifier 24', the resultant pulse level will be great enough to produce a gain control signal which substantially attenuates the received video signal.

Therefore, it is intended that the appended claims be interpreted as including all of the foregoing as well as other such changes and modifications.

What is claimed is:

1. A method of providing an anti-piracy video signal of the type having horizontal line intervals defined between periodic horizontal blanking intervals such that the anti-piracy video signal will produce a video picture on a standard video display device but will prevent reproducing of an unauthorized recording of such signal by means of a video recorder having an automatic gain control circuit responsive to predetermined portions of the video signal in said horizontal blanking intervals; said method comprising the steps of generating pulse signals each having an amplitude which is sufficient to cause overcompensation of said automatic gain control circuit when made effective on the latter at the same time as one of said predetermined portions of the video signal, and inserting said generated pulse signals into respective horizontal blanking intervals of said video signal at fixed locations relative to said predetermined portions of the video signal such that, on unauthorized recording of the resulting anti-piracy video signal by said video recorder, said overcompensation of the automatic gain control circuit occurs and the resulting recorded video signal is excessively attenuated.

2. The method of claim 1 wherein the level of each of said generated pulse signals is substantially equal to the peak white level of said video signal, and said generated pulse signals are inserted into respective horizontal blanking intervals at the back porch of the horizontal synchronizing pulses included in said blanking intervals.

3. The method of claim 1 wherein the level of each of said generated pulse signals is substantially equal to the peak white level of said video signal, and said generated pulse signals are inserted into respective horizontal blanking intervals at the front porch of the horizontal synchronizing pulses included in said blanking intervals.

4. The method of claim 1 wherein said video signal is a color television signal having burst signals included in said horizontal blanking intervals following the horizontal synchronizing pulses therein, and wherein said generated pulses are inserted into respective horizontal blanking intervals following said burst signals.

5. The method of claim 1 wherein each said generated pulse signal has an amplitude substantially equal to the peak white level of said video signal plus the amplitude of the horizontal synchronizing pulses normally included in said horizontal blanking intervals, and wherein said generated pulses are inserted into respective horizontal blanking intervals during the horizontal synchronizing pulse duration.

6. The method of claim 1 wherein said step of generating pulse signals comprises detecting the horizontal blanking intervals in said video signal; and producing each of said pulse signal at a uniformly predetermined time during each of said detected horizontal blanking intervals.

7. The method of claim 1 wherein said step of generating pulse signals comprises detecting the horizontal synchronizing pulse in each horizontal blanking interval; and producing each said pulse signal in response to said detected horizontal synchronizing pulse at a predetermined uniformly delayed time with respect thereto.

8. The method of claim 7 wherein said step of producing comprises inverting and amplifying said detected horizontal synchronizing pulse to form said pulse signal whose amplitude is equal to said peak white level; and delaying said pulse signal by a predetermined amount.

9. The method of claim 8 wherein said step of inserting comprises mixing said video signal and said delayed pulse signal to form the anti-piracy video signal.

10. A method of preparing a master video recording medium from which recorded video signals can be played back and used in a standard video display device to reproduce a video picture but which, if said played back video signals are re-recorded on a copy medium by means of a video recorder having an automatic gain control circuit responsive to predetermined portions of the video signals, a satisfactory video pressure will not be reproduced by playing back the video signals from said copy medium, the video signals including periodic horizontal blanking intervals in which said predetermined portions are located, said method comprising the steps of receiving said video signal, generating pulse signals of a predetermined amplitude which is sufficient to cause overcompensation of said automatic gain control circuit when made effective on the latter at the same time as one of said predetermined portions of the video signals, inserting said generated pulse signals into respective horizontal blanking intervals in said received video signals at fixed locations relative to said predetermined portions of the video signals, and recording said video signals having said inserted pulse signals so that, on playback and unauthorized re-recording of the resulting anti-piracy video signals by said video recorder, said overcompensation of the automatic gain control circuit occurs and the resulting re-recorded video signals are excessively attenuated.

11. The method of claim 10 wherein said step of generating pulse signals comprises detecting horizontal synchronizing pulses included in said horizontal blanking intervals, producing a pulse signal of said predetermined amplitude in response to each detected horizontal synchronizing pulse, and delaying said pulse signal by a predetermined time delay.

12. The method of claim 11 wherein said step of producing comprises inverting and amplifying each detected horizontal synchronizing pulse.

13. The method of claim 12 wherein said step of inserting comprises combining said received video signal and said delayed pulse signals.

14. Apparatus for processing a video signal so as to enable a standard television receiver to display a video picture upon reception of the processed video signal, but to prevent a satisfactory reproduction of a video picture in the event that the processed video signal is reproduced after being recorded without authorization by means of a video recorder having an automatic gain control circuit responsive to predetermined portions of the video signal; comprising receiving means for receiving a video signal including periodic horizontal blanking intervals in which said predetermined portions are located, generating means for generating pulse signals whose amplitudes are sufficient to cause overcompensation of said automatic gain control circuit when made effective on the latter at the same time as said predetermined portions of the video signal, inserting means for inserting said pulse signals into respective horizontal blanking intervals of said received video signal at fixed locations relative to said predetermined portions of the video signal, and output means to which said received video signal, including said inserted pulse signals, are supplied so that, on unauthorized recording of the recording output signal by said video recorder, said overcompensation of the automatic gain control circuit occurs and the recorded signal is excessively attenuated.

15. The apparatus of claim 14 wherein said generating means comprises synchronizing signal separator means coupled to said receiving means for separating the horizontal blanking intervals from said video signal; and means for producing said pulse signals at predetermined times during respective horizontal blanking intervals.

16. The apparatus of claim 15 wherein said means for producing comprises signal shaping means coupled to said synchronizing signal separator means for shaping the horizontal synchronizing pulse included in a respective horizontal blanking interval into a pulse signal of predetermined amplitude; and delay means for delaying said pulse of predetermined amplitude.

17. The apparatus of claim 16 wherein said signal shaping means comprises means for inverting and amplifying said horizontal synchronizing pulse.

18. The apparatus of claim 15 wherein said inserting means comprises combining means for combining said received video signal and said produced pulse signals to form a modified video signal.

19. The apparatus of claim 18 wherein said output means comprises video signal transmission means.

20. The apparatus of claim 18 wherein said output means comprises a video signal recorder having an AGC circuit insensitive to said produced pulse signals.

* * * * *